United States Patent [19]

Knoedler et al.

[11] Patent Number: 4,662,683
[45] Date of Patent: May 5, 1987

[54] JUVENILE CAR SEAT

[75] Inventors: Roy E. Knoedler; Donald L. Gerken; Kenneth P. Morton, all of Columbus, Ind.

[73] Assignee: Cosco, Inc., Columbus, Ind.

[21] Appl. No.: 707,223

[22] Filed: Mar. 1, 1985

[51] Int. Cl.$^4$ .............................................. A47D 1/10
[52] U.S. Cl. ..................................... 297/488; 297/487
[58] Field of Search ............... 297/487, 488, 250, 216, 297/484, 485

[56] References Cited

U.S. PATENT DOCUMENTS

| | | | |
|---|---|---|---|
| 2,244,650 | 6/1941 | Curran et al. | 297/487 |
| 2,346,871 | 4/1944 | Provenzano | 297/487 X |
| 2,668,583 | 2/1954 | Singer | 297/488 |
| 2,861,626 | 11/1958 | Mills, Jr. | 297/488 |
| 3,409,326 | 11/1968 | Kerner | 297/488 X |
| 3,767,259 | 10/1973 | Blake et al. | 297/488 X |
| 3,899,042 | 8/1975 | Bonar | 297/487 |
| 4,186,961 | 2/1980 | Farrell, Jr. et al. | |
| 4,342,483 | 8/1982 | Takada | 297/488 |
| 4,343,510 | 8/1982 | Cone | |
| 4,376,551 | 3/1983 | Cone | |
| 4,429,916 | 2/1984 | Hyde et al. | 297/488 X |
| 4,568,122 | 2/1986 | Kain | 297/250 X |

FOREIGN PATENT DOCUMENTS

| | | |
|---|---|---|
| 2545915 | 4/1976 | Fed. Rep. of Germany. |
| 2623102 | 12/1976 | Fed. Rep. of Germany. |
| 5566 | of 1901 | United Kingdom ................ 297/488 |

Primary Examiner—Peter A. Aschenbrenner
Attorney, Agent, or Firm—Barnes & Thornburg

[57] ABSTRACT

A juvenile car seat for supporting a child is disclosed. The seat includes a bottom seat portion and a back support portion. A barrier shield is provided which includes an arm member, a first shield member, and a second shield member. Each of the first and second shield members is pivotally coupled to the arm member for pivoting between a use position generally above and parallel to the bottom seat portion, and a storage position generally to the side of the bottom seat portion. A latch and buckle are provided for fixing the first and second shield members in the use position. A shoulder harness is also provided. The shoulder harness includes a first shoulder strap connected between the back support portion and the first shield member, and a second shoulder strap connected between the back support portion and the second shield member. The shoulder straps and shield members are cooperable to place the shoulder straps in front of the torso of the child when the shield members are in the use position and to place the shoulder straps away from the torso of the child when the shield members are in the storage position.

13 Claims, 12 Drawing Figures

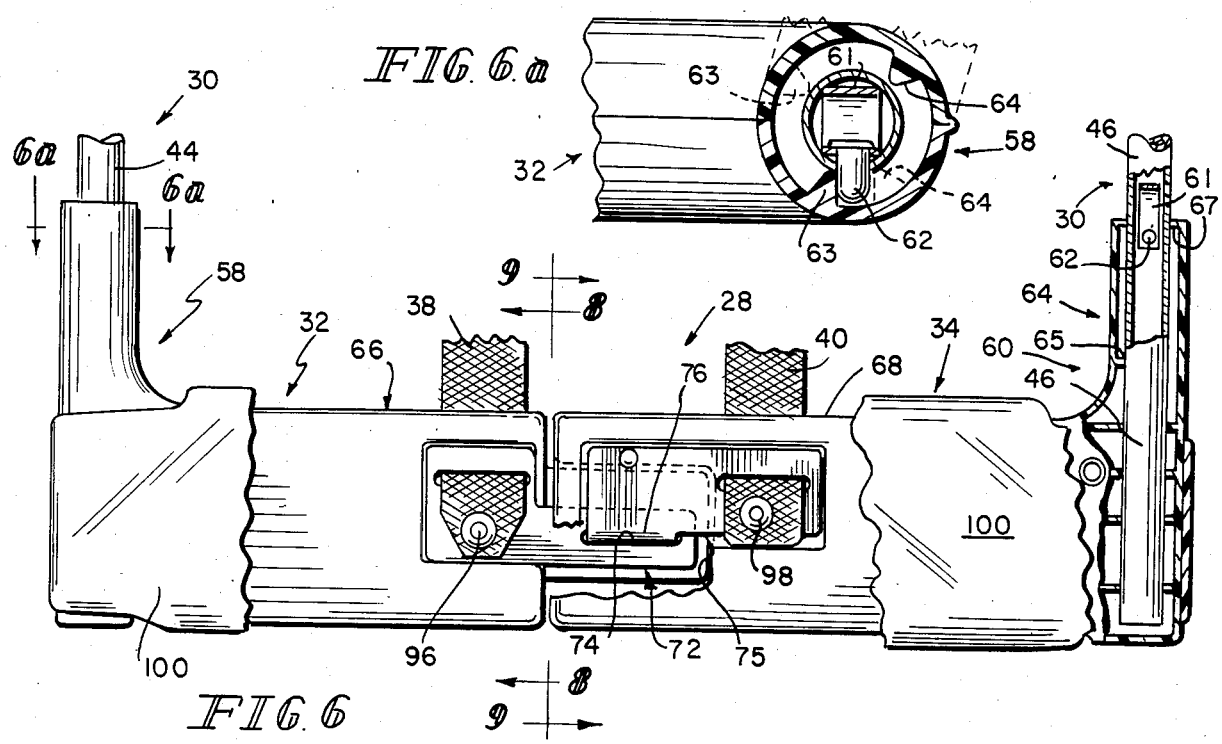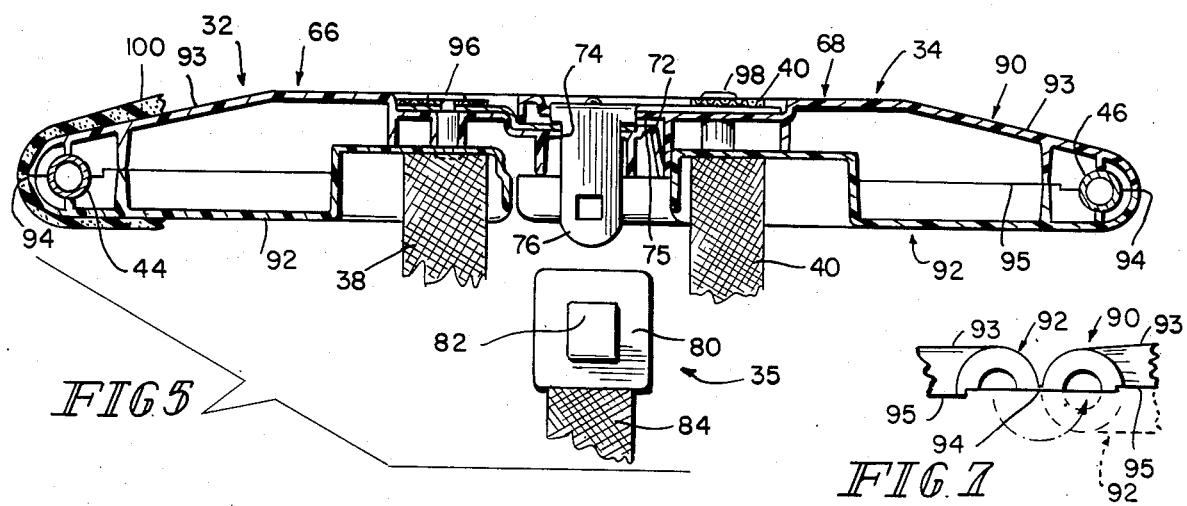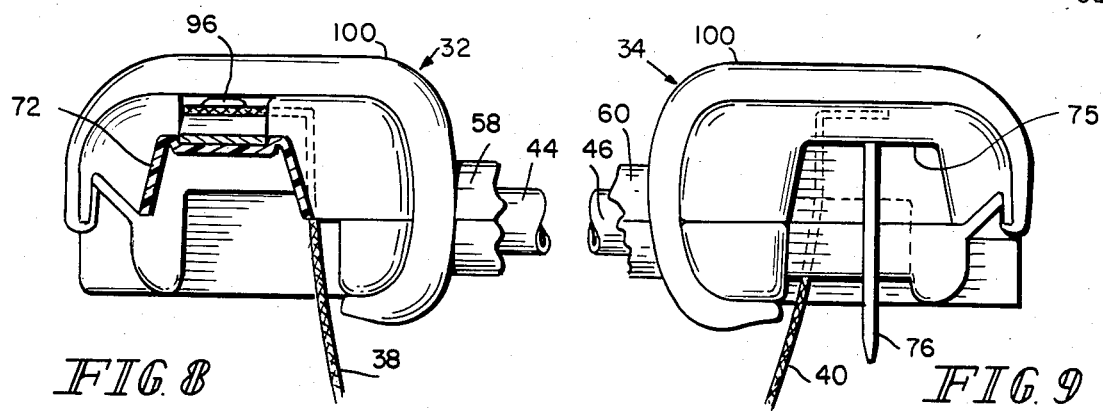

JUVENILE CAR SEAT

This invention is related to juvenile car seats, and more particularly to juvenile car seats having restraint systems for preventing injury to a child in case the car in which the seat is being used stops suddenly or is involved in an accident.

Several United States and foreign patents disclose child car seats having restraint systems. These patents include: Cone U.S. Pat. No. 4,343,510; Cone U.S. Pat. No. 4,376,551; Hyde et al U.S. Pat. No. 4,429,916; Farrell et al. U.S. Pat. No. 4,186,961; German Offenlegungsschrift No. 26 23 102; and German Offenlegungsschrift No. 25 45 915.

Another reference of note is Maloney U.S. patent application Ser. No. 581,977, now U.S. Pat. No. 4,603,902, which is assigned to the same assignee as the instant application. Maloney relates to a foldable high chair which includes a variably positionable back support portion.

Additionally, a booster seat incorporating a split barrier shield is known. This booster seat is manufactured by the Bobby-Mac division of Questor and is designated by the manufacturer as the Wings model.

In accordance with the present invention, a juvenile car seat comprises a seat for supporting a child. The seat includes a bottom seat portion and a back support portion. A split barrier shield is provided which includes a first shield member, and a second shield member. The shield members are disposed on opposite sides of the shell. Mounting means are provided for mounting each of the shield members for movement between a use position generally above and parallel to the bottom seat portion, and a storage position generally to the side of the seat portion. Fixing means are provided for fixing the first and second shield members in the use position. A shoulder harness means is also provided. The shoulder harness means includes a first shoulder strap connected between the back support portion and the first shield member, and a second shoulder strap connected between the back support portion and the second shield member. The shoulder straps and shield members are cooperable to place the shoulder straps in front of the torso of the child when the shield members are in the use position and to place the shoulder straps away from the torso of the child when the shield members are in the storage position.

In a preferred embodiment, the mounting means comprises an arm member which is pivotally coupled to the seat for permitting the shield members, when in their storage position, to move from a position generally in front of the back support portion to a position generally alongside the back support portion. The first shield member includes a tongue portion having an aperture, and the second shield member includes a yoke portion for receiving the tongue, and a latch insertable through the aperture. The fixing means comprises a buckle engageable with the latch to maintain the latch in the aperture. A crotch strap is connected to the buckle and extends between the buckle and the bottom seat portion of the seat.

Also in accordance with the present invention, a juvenile car seat is provided which comprises a seat for supporting a child. The seat includes a bottom seat portion and a back support portion. The back support portion includes a pair of spaced apertures through which a vehicle safety belt can pass for anchoring the seat to the vehicle seat. A seat cushion is disposed adjacent the bottom seat portion of the seat, and a back support cushion is disposed adjacent the back support portion of the seat. The back support cushion includes a removable portion disposed adjacent the spaced apertures of the back support portion for permitting access to the spaced apertures.

One aspect of the present invention is that the seat includes a split barrier shield having first and second shield members which are pivotable about an arm member from a use position generally in front of the child in the seat, to a storage position at the side of the child. The second shield member includes a stud which is engageable with an aperture in the first shield member to couple the first and second shield members, and a fixing means for maintaining the stud in the aperture.

This arrangement has the advantage of facilitating the placement of a child into the seat, and the removal of the child from the seat. The stud, aperture and fixing means arrangement provides a secure locking means for maintaining the first and second shield members in their use position, to provide a shield which protects the child in case the car is involved in an accident or stops abruptly.

Another aspect of the present invention is that the arm member to which the shield members are pivotally coupled is itself pivotally coupled to the seat. Through this arrangement, the parent can move the shield members to a position alongside the back support portion of the seat. When alongside the back support portion of the seat, the side of the seat is substantially unobstructed by the barrier, thus facilitating the parent's placement of a child into the seat, and removal of the child from the seat.

One feature of the present invention is that a shoulder harness is provided which includes a first shoulder strap which extends between the back support portion and the first shield member, and a second shoulder strap which extends between the back support portion and the second shield member. This feature has the advantage of facilitating the placement of the shoulder harness on the child. When the shield members are fixed in their use position, the shoulder straps are placed in front of the torso of the child to restrain the movement of the child's upper body in the event of a sudden stop by the car. When the first and second shield members are pivoted about the arm to their storage positions, the shoulder straps are moved away from the torso of the child so that the shoulder straps will not interfere with removal of the child from the seat.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which:

FIG. 5 is a sectional view taken along lines 5—5 of FIG. 3;

FIG. 6 is a top view, partly broken away, of the shield members in their use position;

FIG. 6a is an enlarged, sectional view taken along lines 6a—6a of FIG. 6;

FIG. 7 is a partial view of the portion of a shield member adjacent an arm member;

FIG. 8 is a sectional view taken along lines 8—8 of FIG. 6;

FIG. 9 is a sectional view taken along lines 9—9 of FIG. 6;

Figure 1:
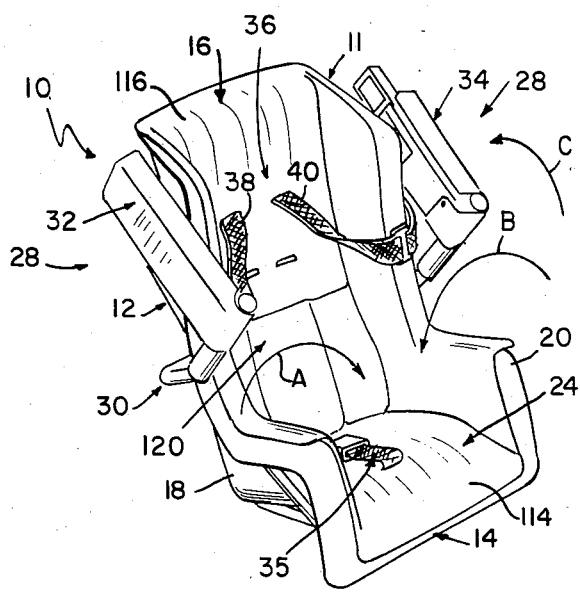
FIG. 1 is a perspective view of the present invention showing the shield members in their storage position, and the arm member positioned to place the shield members generally alongside the back support portion of the seat.
Figure 2:
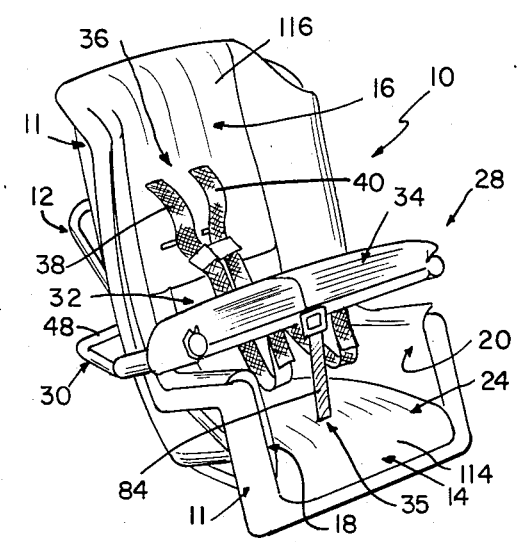
FIG. 2 is a perspective view showing the shield members in their use position.

A juvenile car seat 10 is shown in FIGS. 1 and 2 as including a shell 11. Shell 11 is preferably unitarily formed of a suitable plastic material. Tubular metal frame members 12 are provided for adding structural rigidity to the shell 11. A base (not shown) can be disposed under the shell 11, and connected to the frame members 12 for supporting the shell 11 above a vehicle seat (not shown). The shell 11 includes a bottom seat portion 14 which is provided for supporting a child's bottom and upper legs, and a back support portion 16 which preferably has a greater longitudinal extent than the longitudinal extent of the child sitting in the seat 10, so that the top of the back support portion 16 is above the top of the child's head when the child is seated in the seat 10. First and second side wall portions 18, 20 are provided for preventing lateral movement of a child in the seat 10. A cushion 24 is disposed on the forward-facing surface of the shell 11 to provide a soft seating surface for the child and to protect the child in case of an impact of the child against the surface of the shell 11.

A restraint system such as a split barrier shield 28 is provided for restraining forward movement of a child in the seat 10 to protect the child in case of accident or other abrupt stop of the vehicle. Barrier shield 28 includes a a first shield member 32, and a second shield member 34. A mounting and support means such as a U-shaped tubular arm member 30 is provided for mounting each of the shield members 32, 34, for movement between a use position generally above and parallel to the bottom seat portion 14, and a storage position generally to the side of the seat portion 14. A fixing means 35 is provided for engaging one of the first and second shield members 32, 34 for fixing the first and second shield members 32, 34 in their use position by fastening the shield members 32, 34 together, as shown in FIG. 2.

A shoulder harness 36 is provided for further restraining a child's movement relative to the shell 11. Shoulder harness 36 includes a first shoulder strap 38 which extends between the back support portion 16 of the shell 11 and the first shield member 32. The shoulder harness 36 also includes a second shoulder strap 40 which extends between the back support portion 16 of the shell 11 and the second shield member 34. The shoulder harness 36, arm member 30, and first and second shield members 32, 34 are cooperable to place the shoulder straps 38, 40 in front of the torso of the child when the shield members 32, 34 are in their use position (FIG. 2), and to place the shoulder straps 38, 40 away from the torso of the child when the shield members are in their storage position, as shown in FIG. 1.

The shield members 32, 34 are each independently pivotable about the arm member 30. The shield members 32, 34 are pivotally movable in a direction indicated generally by arrows A and B (FIG. 1), respectively, between their storage positions wherein the shield members 32, 34 are to the side of the bottom seat portion 14 of the shell 11, and their use positions (shown in FIG. 2) wherein the shield members 32, 34 are in a colinear relation. This movement of the shield members 32, 34, in the directions indicated by arrows A and B is movement in a plane generally parallel to the plane of the back support portion 16. When in their use position, the shield members 32, 34 are placed in front of the torso of the child and placed above and generally parallel to the bottom seat portion 14 of the shell 11.

Additionally, arm member 30 is pivotally movable relative to the shell 11. The pivotal movement of arm 30 moves the shield members 32, 34, when in their storage position, in a direction indicated generally by arrow C of FIG. 1. As indicated by arrow C, the shield members 32, 34 are movable in a plane generally parallel to the side walls 18, 20, from a position generally in front of the back support portion 16 to a position shown in FIG. 1 wherein the shield members 32, 34 are generally alongside the back suppot portion 16 and the portion of the side walls 18, 20 adjacent the back support portion 16.

The structural features of the seat 10 of the present invention are shown in more detail in FIGS. 3-9. Arm member 30 is generally U-shaped and includes a first end portion 44 to which the first shield member 32 is pivotally attached, a second end portion 46 to which the second shield member 34 is pivotally attached, and an intermediate portion 48. The intermediate portion 48 extends generally coextensively with the side wall portions 18, 20 and a rearwardly-facing surface 54 of the back support portion 16 of the shell 11. The intermediate portion 48 is pivotally captured between a portion 52 of one of the tubular frame members 12 and the rearwardly-facing surface 54 of the back support portion 16 of the shell 11. The intermediate portion 48 of the arm member 30 is pivotally captured to permit the arm member 30 to pivot relative to shell 11. A spring 55 and lever 56 arrangement is operatively coupled to the arm member 30 near its second end portion 46 to normally bias the arm member 30 to move upwardly to place the first and second shield members 32, 34 in a position alongside the back support portion 16, as shown in FIG. 1.

As best shown in FIGS. 5 and 6, each of the first and second shield members 32, 34 are generally L-shaped, and include first leg portions 58, 60, and second leg portions 66, 68, respectively.

Figure 4:
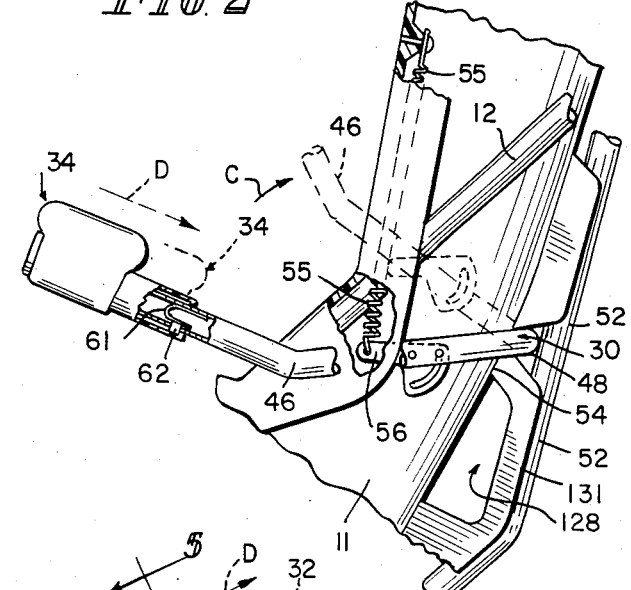
FIG. 4 is a partial, side view of the seat, partly broken away, taken from the left side of the seat.
Figure 3:
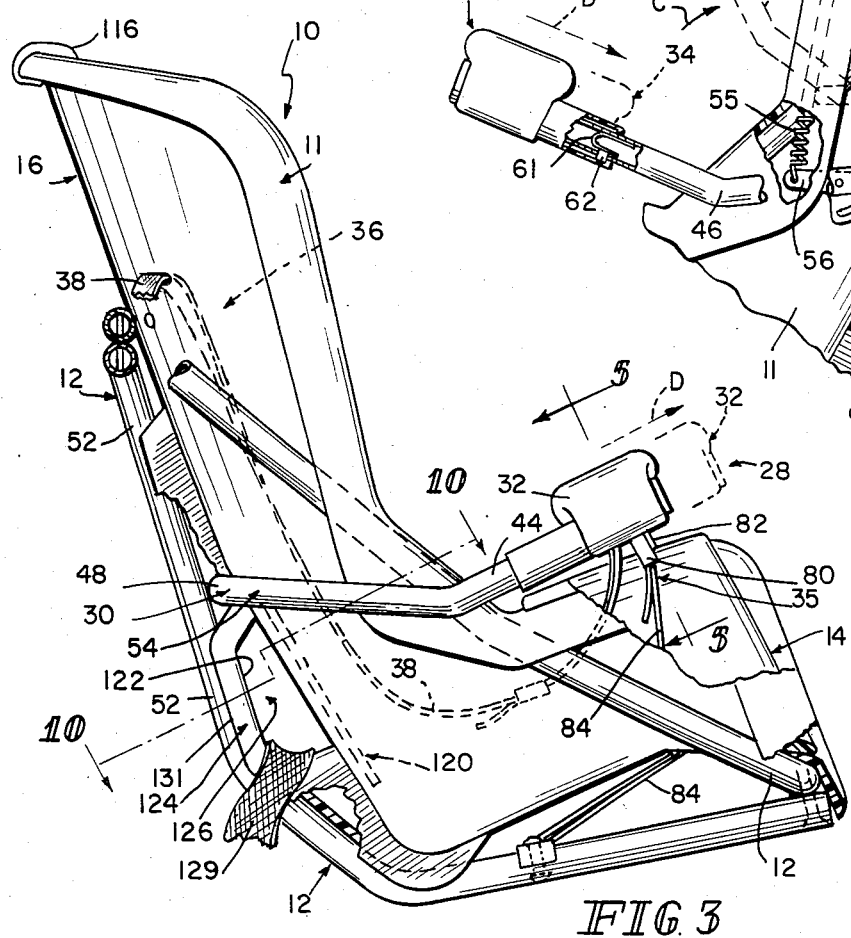
FIG. 3 is a side view of the seat, partly broken away, taken from the right side of the seat.

First and second shield-to-arm coupling means are provided for coupling the first and second shield members 32, 34 to the respective first and second end portions 44, 46 of the arm member 30. The first and second shield-to-arm coupling means are also provided for restricting the pivotal movement of the shield members 32, 34 to an approximately 105° arc between their use and storage positions, and for permitting the shield members 32, 34 to be variably longitudinally positioned on the arm member 30. As best shown in FIGS. 3 and 4, the shield members 32, 34 are movable in a direction indicated generally by arrow D, between an inward position (shown in solid in FIG. 3) and an outward position (shown in phantom in FIG. 3).

As shown in FIGS. 4, 6, and 6a, each shield-to-arm coupling means includes a C-shaped spring clip 61 which is inserted into the interior of the respective first or second end portion 44, 46 of the arm member 30. Each C-shaped spring clip 61 includes a post 62, which extends downwardly through one of a pair of apertures (not shown). Both of the apertures (not shown) are formed in the lower surface of the arm member 30. One of the apertures is formed in the first end portion 44 of the arm member 30, and the other of the apertures is formed in the second end portion 46 of the arm member 30. Both apertures are disposed approximately four inches (10.16 cm) from the respective ends of the arm member 30.

The first leg portions 66, 68 of each of the shield members 32, 34 are formed to include first and second longitudinal ribs 63, 64. The first and second longitudinal ribs 63, 64 are spaced apart by slightly more than 105°, and extend longitudinally between first and second end flanges 65, 67. The first and second end flanges 65, 67 are disposed approximately four inches (10.16 cm) apart and extend generally transversely to the longitudinal ribs 63, 64.

When the shield members 32, 34 are coupled to the respective first and second end portions 44, 46 of the arm member 30, the post 62 is trapped within a space defined by the longitudinal ribs 63, 64 and the end flanges 65, 67. The engagement of the post 62 and the first longitudinal rib 63 restricts the shield member 32 or 34 from pivoting past its use position. The engagement of the post 62 and the second longitudinal rib 64 restricts the shield member 32 or 34 from pivoting past its storage position. Similarly, the engagement of the post 62 and the first end flange 65 restricts the shield member 32 or 34 from moving past its inward position, and the engagement of post 62 and the second end flange 67 restricts the shield member 32 or 34 from moving past its outward position.

The second leg portions 66, 68 of the shield members 32, 34 form the barrier which can be placed in front of the child in the seat 10 to restrain the child's movement. Each of the second leg portions 66, 68 includes a longitudinal axis which is generally perpendicular to the axis of the first and second end portions 44, 46 of the arm member 30. The longitudinal axes of the second leg portions 66, 68 are generally colinear when the shield members 32, 34 are in their use position.

The second leg portion 66 of the first shield member 32 is formed to include a portion which forms an inverted, trough-shaped tongue 72. Tongue 72 extends outwardly from the major portion of the first shield member 32, generally colinearly with the longitudinal axis of the first shield member 32. The tongue 72 also includes a slot-shaped aperture 74. The tongue 72 is positioned to be received by a yoke portion 75 of the second shield member 34.

The yoke portion 75 also has an inverted trough shape, and is formed on the underside surface of the second shield member 34. The yoke portion 75 includes a downwardly extending stud member such as a seat belt latch 76. Latch 76 is positioned to be inserted through the aperture 74 formed in the tongue 72, when the first and second shield members 32, 34 are in their use position. By maintaining the latch 76 in the aperture 74, the yoke portion 75 of the second shield member 34 is maintained in an overlaying relationship to the tongue 72 of the first shield member 32. This arrangement interlocks the first and second shield members 32, 34 to maintain the shield members 32, 34 in their colinear use position.

The fixing means 35 is provided for fixing the first and second shield members 32, 34 in their use position. The fixing means 35 includes an engaging means such as a buckle 80 which is engageable with the latch 76 to maintain the latch 76 in the aperture 74 of the tongue 72. A release button 82 is provided on the buckle 80 for permitting the user to release the buckle 80 from its engagement with the latch 76. A crotch strap 84 is connected at one end to buckle 80 and extends between the buckle 80 and bottom seat portion 14 of the shell 11 to maintain the first and second shield members 32, 34 in their use position in front of a child, as shown in FIG. 2. Preferably, the end of the crotch strap 84 opposite to that end connected to buckle 80 is securely anchored to one or both of the tubular frame members 12 which are disposed beneath the bottom seat portion 14.

As shown in FIGS. 5 and 7, each of the first and second shield members 32, 34 are designed to be easily manufactured by a conventional molding process. Each of the first and second shield members 32, 34 are configured to include an upper half 90 and a lower half 92 which are connected by a hinge portion 94. The upper and lower halves 90, 92 are molded in a colinear relation so that the exterior surfaces 93 of the upper and lower halves 90, 92 are on the same side of the mold die (not shown) and that the interior surfaces 95 of the upper and lower halves 90, 92 are also on the same side of the mold die (not shown). After the shield members 32, 34 are released from the mold, the lower half 92 is rotated relative to the upper half 90, 180° about hinge portion 94 to capture one of the first and second end portions 44, 46 of arm member 30, and to place the upper and lower halves 90, 92 in an opposed relation. Rivets 96, 98 are provided for securing the upper and lower halves 90, 92 together. Additionally, rivets 96, 98 can be used to secure the first and second shoulder straps 38, 40 to the respective first and second shield members 32, 34. A layer of cushioning material 100 is then placed over the exterior surface of each of the shield members 32, 34.

Figure 10:
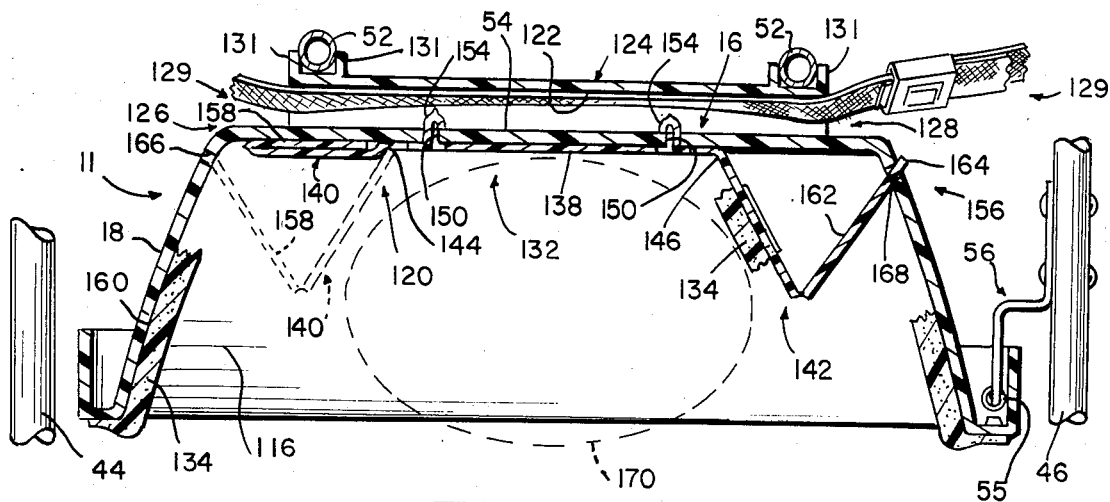
FIG. 10 is a sectional view taken along lines 10—10 of FIG. 3.
Figure 11:
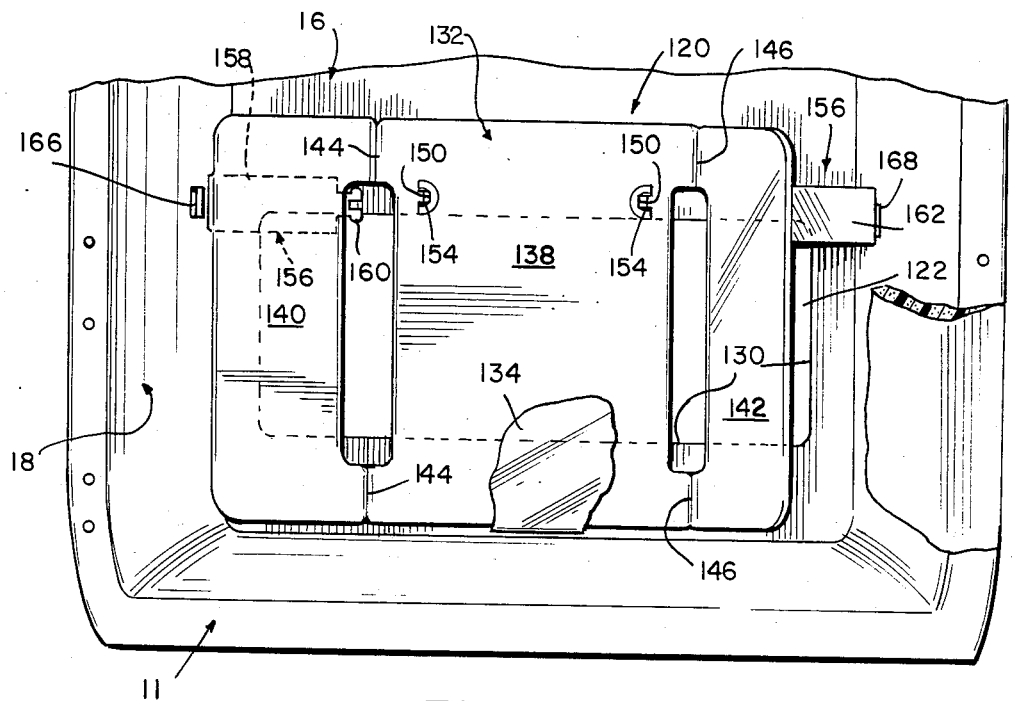
FIG. 11 is a front view, partially broken away, of the lower portion of the back support portion of the seat.

As best shown in FIG. 1, the cushion 24 includes a seat cushion portion 114 which covers the surfaces of the bottom seat portion 14 of the shell 11 and a back support cushion portion 116 which covers the surface of the back support portion 16 of the shell 11. The back support cushion portion 116 includes a removable portion 120 which is disposed adjacent the lower portion of the back support portion 16 of the shell 11. As best shown in FIGS. 10 and 11, the removable portion 120 is removable to permit the user to gain access to the forward-facing surface 122 of a seat belt anchoring panel 124.

Seat belt anchoring panel 124 is formed to extend generally parallel to the rest of back support portion 16, but to be disposed in a rearwardly spaced relation therefrom. A window 130 is formed in the back support portion 16 of the shell 11 which corresponds generally in size and position to the seat belt anchoring panel 124.

A pair of spaced apertures such as first slot 126 and second slot 128 are formed at either end of the seat belt anchoring panel 124, between the seat belt anchoring panel 124 and the back support portion 16 of the shell 11. The user anchors the seat 10 to the vehicle seat by passing a vehicle seat belt 129 through the first and second slots 126, 128 so that the vehicle seat belt 129 engages the front surface 122 of the seat belt anchoring panel 124. The removable portion 120 is provided to permit the user to gain access to the area adjacent the front surface 122 of the seat belt anchoring panel 124 from the front of the seat 10 to manipulate the belt 129 in its passage around the seat belt anchoring panel 124. The seat belt anchoring panel 124 also includes rearwardly disposed flanges 131 which form a channel for receiving the portion 52 of the tubular frame member 12 adjacent the back support portion 16.

The removable portion 120 of the back support cushion portion 116 includes a rigid member 132 which is overlain with cushioning material 134. The rigid member 132 includes a generally stationary central section 138, a first side section 140, and a second side section 142. The first side section 140 is hingedly connected to the central section 138 by a first hinge 144, and is movable between a first position (shown in solid in FIG. 10) generally coplanar with the central section 138 and a second position (shown in phantom in FIG. 10) angled from the plane of the central section 138. Similarly, the second side section 142 is movable about second hinge 146 from a first position, generally coplanar with the central section 138, to a second position angled from the plane of the central section 138.

The central section 138 includes a pair of rearwardly extending, molded push pins 154. Push pins 154 can be inserted through apertures 150 in the back support portion 16 of the shell 11 to secure the removable portion 120 to the shell 11.

Each of the first and second side sections 140, 142 of the rigid member 132 includes a retention means 156 for retaining the respective first and second side sections 140, 142 in their second positions. The retention means 156 of the first side section 140 comprises a first elongated tab member 158 having a keyed end 160. The keyed end 160 is insertable into a first retention means receiving aperture 166 which is formed in the first side wall portion 18 of the shell 11 near the intersection of the first side wall portion 18 and the back support portion 16. When the keyed end 160 is inserted into the first retention means receiving aperture 166, the first side section 140 will be maintained in its second position. Similarly, the retention means 156 of the second side section 142 comprises a second elongated tab 162, similar to tab 158, having a keyed end 164, which is insertable into a corresponding second retention means receiving aperture 168.

The placement of the first and second side sections 140, 142 in their second positions is especially useful for carrying smaller children. As best shown in FIG. 10, when the first and second side sections 140, 142 are placed in their second positions, the first and second sections 140, 142 will partially surround a small child 170 seated in the seat 10 to laterally support the child. This lateral support is especially helpful with smaller children who are either too young or do not otherwise have sufficient muscular coordination to sit up straight in the seat 10 on their own. As the child 170 grows larger, the side sections 140, 142 can be placed in their first positions, generally coplanar with the central section 138, to provide sufficient lateral width to receive a wider relatively older child's body.

Although the invention has been described in detail with reference to certain preferred embodiments and specific examples, variations and modifications exist within the scope and spirit of the invention as described and as defined in the following claims.

What is claimed is:

1. A juvenile car seat for restraining a juvenile seated in the car seat comprising
   a seat shell including a bottom seat portion and a back support portion,
   a split barrier shield comprising first and second shield members, mounting means for mounting each of said shield members at opposite sides of said shell for movement between use positions and storage positions,
   said shield members comprising bar-like members which when in their use positions extend from opposite sides of said seat shell at least partially across said bottom seat portion in front of said seated juvenile between said bottom seat portion and a top of said back support portion, and when in their storage positions are spaced from each other to form a gap therebetween sufficient to permit a juvenile to be placed into and removed from said car seat through said gap,
   fixing means for coupling the first and second shield members together in their use positions and for retaining said shield members in their use positions, and
   a shoulder harness including a first shoulder strap connected between the back support portion and the first shield member and a second shoulder strap connected between the back support portion and the second shield member, the shoulder straps and shield members being cooperable to place the shoulder straps in front of the torso of the seated juvenile when the shield members are in the use position and to place the shoulder straps away from the torso of the seated juvenile when the shield members are in the storage position, wherein the mounting means includes a generally U-shaped arm member having a first end portion to which the first shield member is pivotally coupled for movement in an arc about the first end portion, a second end portion to which the second shield member is pivotally coupled for movement in an arc about the second end portion, and an intermediate portion between the first and second end portions, the intermediate portion being pivotally coupled to the seat for permitting the end portions to move upwardly and downwardly and carry the shield members upwardly and downwardly.

2. The juvenile car seat of claim 1 wherein the first shield member has an aperture extending therethrough and the second shield member has a stud extending outwardly therefrom, the stud insertable through the aperture in the first shield member when the first and second shield members are in their use positions, and said fixing means has affixed thereto an engaging means for engaging the stud to maintain the stud in the aperture.

3. A juvenile carseat for restraining a juvenile seated in the car seat comprising
   a seat shell including a bottom seat portion and a back support portion,
   a split barrier shield comprising first and second shield members, mounting means for mounting each of said shield members at opposite sides of said shell for movement between use positions and storage positions,
   said shield members comprising bar-like members which when in their use positions extend from opposite sides of said seat shell at least partially across said bottom seat portion in front of said seated juvenile between said bottom seat portion and a top of said back support portion, and when in their storage positions are spaced from each other to form a gap therebetween sufficient to permit a juvenile to be placed into and removed from said car seat through said gap, fixing means for coupling the first and second shield members together in their use positions and for retaining said shield members in their use positions, and a shoulder harness including a first shoulder strap connected between the back support portion and the first shield member and a second shoulder strap connected between the back support portion and the second shield member, the shoulder straps and shield members being cooperable to place the shoulder straps in front of the torso of the seated juvenile when the shield members are in the use position and to place the shoulder straps away from the torso of the seated juvenile when the shield members are in the storage position, wherein the first shield member carries a tongue portion having an aperture, the second shield member carries a yoke portion for receiving the tongue portion and a latch extending from the yoke portion which is insertable through the aperture when the first and second shield members are in their use positions, and the fixing means comprises a crotch strap secured at one end to said bottom seat portion of the seat and having a buckle at a second end, the buckle engaging the latch when the latch is inserted through the aperture to maintain the latch in the aperture.

4. The juvenile car seat of claim 3 wherein the mounting means includes an arm member to which the shield members are pivotally coupled, each of the first and second shield members has a longitudinal dimension having a longitudinal axis generally perpendicular to an axis about which the shield members pivot on the arm member, the tongue portion of the first shield member extends generally parallel to the longitudinal axis of the first shield member and the yoke portion of the second shield member is formed on an underside surface of the second shield member.

5. A juvenile car seat for restraining a juvenile seated in the car seat comprising a seat shell including a bottom seat portion and a back support portion, a split barrier shield comprising first and second shield members, mounting means for mounting each of said shield members at opposite sides of said shell for movement between use positions and storage positions, said shield members comprising bar-like members which when in their use positions extend from opposite sides of said seat shell at least partially across said bottom seat portion in front of said seated juvenile between said bottom seat portion and a top of said back support portion, and when in their storage positions are spaced from each other to form a gap therebetween sufficient to permit a juvenile to be placed into and removed from said car seat through said gap, fixing means for coupling the first and second shield members together in their use positions and for retaining said shield members in their use positions, and a shoulder harness including a first shoulder strap connected between the back support portion and the first shield member and a second shoulder strap connected between the back support portion and the second shield member, the shoulder straps and shield members being cooperable to place the shoulder straps in front of the torso of the seated juvenile when the shield members are in the use position and to place the shoulder straps away from the torso of the seated juvenile when the shield members are in the storage position, wherein the seat includes side wall portions disposed in a plane generally normal to the seat and back support portions, the mounting means includes a generally U-shaped arm member having a first end portion to which the first shield member is pivotally coupled for movemennt in an arc about the first end portion generally parallel to the back support portion between its use and storage positions, a second end portion to which the second shield member is pivotally coupled for movement in an arc about the second end portion generally parallel to the back support portion between its use and storage position, and an intermediate portion pivotally coupled to the seat to permit the arm member to move the end portions in an arc generally parallel to the side wall portions and carry the shield members in the arc generally parallel to the side wall portions.

6. A juvenile car seat for restraining a juvenile seated in the car seat comprising a seat shell including a bottom seat portion and a back support portion, a split barrier shield comprising first and second shield members, mounting means for mounting each of said shield members at opposite sides of said shell for movement between use positions and storage positions, said shield members comprising bar-like members which when in their use positions extend from opposite sides of said seat shell at least partially across said bottom seat portion in front of said seated juvenile between said bottom seat portion and a top of said back support portion, and when in their storage positions are spaced from each other to form a gap therebetween sufficient to permit a juvenile to be placed into and removed from said car seat through said gap, fixing means for coupling the first and second shield members together in their use positions and for retaining said shield members in their use positions, and a shoulder harness including a first shoulder strap connected between the back support portion and the first shield member and a second shoulder strap connected between the back support portion and the second shield member, the shoulder straps and shield members being cooperable to place the shoulder straps in front of the torso of the seated juvenile when the shield members are in the use position and to place the shoulder straps away from the torso of the seated juvenile when the shield members are in the storage position, wherein the mounting means comprises an elongated, U-shaped arm member having a first end portion, a second end portion, and an intermediate portion, the intermediate portion being pivotally mounted to the seat adjacent the back support portion, the first shield member has a socket therein for pivotally receiving the first end portion of the arm member to permit the first shield member to pivot about the first end portion, and the second shield member has a socket therein for pivotally receiving the second end portion of the arm member to permit the second shield member to pivot about the second end portion.

7. A juvenile car seat for restraining a juvenile seated in the car seat comprising
a seat shell for supporting the juvenile, the seat including a bottom seat portion and a back support portion,
a split barrier shield comprising a generally U-shaped arm member having a first end portion adjacent a first side of the seat and a second end portion adjacent a second side of the seat, first and second shield members pivotally coupled to the respective first and second end portions of the arm to permit the shield members to pivot between a use position generally above and parallel to the bottom seat portion, and a storage position generally to the side of the bottom seat portion, the first shield member having an aperture extending therethrough and the second shield member carrying a stud which extends therefrom and is insertable through the aperture when the first and second shield members are in their use positions; and means secured to the seat for engaging the stud when it is inserted through the aperture to couple the shield members together in their use positions and retain the shield members in their use positions.

8. The juvenile car seat of claim 7 wherein said first shield member carries a tongue portion in which said aperture is formed, said second shield member carries a yoke portion for receiving the tongue portion, the engaging means comprising a crotch strap connected at one end to the bottom seat portion of the seat and having a buckle affixed at a second end for engaging the stud.

9. The juvenile car seat of claim 7 wherein the generally U-shaped member has an intermediate portion between said first and second end portions, the intermediate portion being pivotally coupled to the seat for permitting the end portions to move upwardly and downwardly and carry the shield members upwardly and downwardly.

10. The juvenile car seat of claim 7 wherein each of the first and second shield members has a longitudinal dimension having a longitudinal axis generally perpendicular to an axis about which the shield members pivot on the arm, the first shield member includes a tongue portion in which said aperture is formed, said tongue portion extends generally parallel to the longitudinal axis of the first shield member, the second shield member includes a yoke portion formed on an underside surface of the second shield member and said stud comprises a latch attached to the yoke portion and which extends generally perpendicular to the longitudinal axis of the second shield member.

11. A juvenile car seat comprising
a shell providing a bottom seat portion, a back support portion and opposite side wall portions,
a restraint system for holding a child in said shell, said restraint system including first and second shield members, mounting means for supporting said shield members for movement between storage positions adjacent said side wall portions and use positions extending across said shell, means for fastening said shield members together and holding them in said use position, and a shoulder strap connected between each shield member and said back support portion to be movable with said shield member between its storage position and its use position, the mounting means including a generally U-shaped arm member having first and second end portions, and first and second shield-to-arm coupling means for movably coupling the first and second shield members to the respective first and second end portions of the arm member to permit the first and second shield members to move longitudinally on the respective first and second end portions of the arm member between inward and outward positions.

12. The juvenile car seat of claim 11 wherein the means for fastening said shield members together includes a portion of the first shield member having an aperture extending therethrough, a stud carried by the second shield member and insertable through the aperture of the first shield member, and fixing means secured to the seat for engaging the stud member to interlock the first and second shield members.

13. The juvenile car seat of claim 11 wherein the mounting means includes means pivotally coupled to the seat for permitting the shield members, when in their storage positions, to move upwardly and downwardly.

* * * * *